US009461921B2

(12) United States Patent
Lee et al.

(10) Patent No.: US 9,461,921 B2
(45) Date of Patent: Oct. 4, 2016

(54) METHOD OF PERFORMING TUNNEL SIGNALING OVER IP TUNNELING PATH AND APPARATUS USING THE METHOD

(71) Applicant: Samsung Electronics Co., Ltd., Suwon-si (KR)

(72) Inventors: Sung-Hyuck Lee, Daegu (KR); Jong-Ho Bang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 14/251,769

(22) Filed: Apr. 14, 2014

(65) Prior Publication Data

US 2014/0219098 A1 Aug. 7, 2014

Related U.S. Application Data

(63) Continuation of application No. 11/582,460, filed on Oct. 18, 2006, now Pat. No. 8,699,495.

(60) Provisional application No. 60/729,234, filed on Oct. 24, 2005.

(30) Foreign Application Priority Data

Jun. 15, 2006 (KR) ........................ 10-2006-0053824

(51) Int. Cl.
| | | |
|---|---|---|
| G01R 31/08 | (2006.01) | |
| H04L 12/801 | (2013.01) | |
| H04L 12/46 | (2006.01) | |
| H04L 29/06 | (2006.01) | |
| H04L 29/08 | (2006.01) | |

(52) U.S. Cl.
CPC ........... *H04L 47/18* (2013.01); *H04L 12/4633* (2013.01); *H04L 29/06* (2013.01); *H04L 67/14* (2013.01); *H04L 69/167* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 7,027,400 | B2 * | 4/2006 | O'Neill ................. | H04L 12/185 370/235 |
| 7,321,587 | B2 * | 1/2008 | Gao et al. ...................... | 370/388 |
| 2002/0105922 | A1 * | 8/2002 | Jabbari et al. ................ | 370/328 |
| 2004/0006641 | A1 | 1/2004 | Abroi et al. | |
| 2004/0008689 | A1 * | 1/2004 | Westphal et al. ........ | 370/395.21 |
| 2004/0095912 | A1 | 5/2004 | Gao et al. | |
| 2004/0109455 | A1 | 6/2004 | Jouppi et al. | |
| 2004/0174865 | A1 * | 9/2004 | O'Neill ......................... | 370/352 |
| 2005/0047340 | A1 | 3/2005 | Babiarz et al. | |

FOREIGN PATENT DOCUMENTS

| | | |
|---|---|---|
| EP | 1 420 559 | 5/2004 |
| EP | 1 450 544 | 8/2004 |
| EP | 1 521 405 | 4/2005 |
| KR | 10-2005-0072808 | 7/2005 |

OTHER PUBLICATIONS

NSIS Flow ID and packet classification issues draft-cheng-nsis-flowid-issues-02.txt; H. Cheng et al.; Oct. 24, 2005; Next steps in Signaling (nsis) Internet-Draft Expires: Apr. 27, 2005; pp. 1-26.
NSIS Operation Over IP Tunnels draft-shen-nsis-tunnel-01.txt; C. Shen et al. Oct. 24, 2005; IETF Next Steps in Signaling Internet-Draft Expires: Apr. 27, 2005, pp. 1-25.
Applicability Statement of NSIS Protocols in Mobile Environment draft-ietf-nsis-applicability-signaling-03. Txt; S. Lee, Ed. Et al.; Oct. 2005; IETF Next Steps in Signaling Internet—Draft Expires: Apr. 27, 2006; pp. 1-62.
Applicability Statement of NSIS Protocols in Mobile Environment draft-ietf-nsis-applicability-signaling-02.txt; S. Lee, Ed.; Jul. 18, 2005; IETF Next Steps in Signaling Internet—Draft Expires: Jan. 19, 2006; pp. 1-4
Newton's Telecom Dictionary, to Newton, Flatiron Publishing, 23rd Updated and Expanded Edition, p. 365.

* cited by examiner

*Primary Examiner* — Faruk Hamza
*Assistant Examiner* — Thinh Tran
(74) *Attorney, Agent, or Firm* — NSIP Law

(57) ABSTRACT

A method and apparatus for performing tunneling signaling over an IP tunneling path connected to an end-to-end path on an IP network are provided, in which an end-to-end signaling flow is received from a sender or a receiver on the end-to-end path, a tunnel signaling flow is generated corresponding to the received end-to-end signaling flow, and the generated tunnel signaling flow is transmitted through the IP tunneling path, the end-to-end signaling flow is forwarded between an entry node and an exit node of the IP tunneling path, and the forwarded end-to-end signaling flow is transmitted to at least any one node on the end-to-end path, wherein the forwarding is simultaneously performed with the transmitting of the tunnel signaling flow, and the transmitting of the end-to-end signaling flow is suspended until the transmitting of the tunnel signaling flow is completed.

16 Claims, 6 Drawing Sheets

METHOD OF PERFORMING TUNNEL SIGNALING OVER IP TUNNELING PATH AND APPARATUS USING THE METHOD

CROSS-REFERENCE TO RELATED APPLICATIONS

This application is a continuation of U.S. patent application Ser. No. 11/582,460, now U.S. Pat. No. 8,699,495, filed on Oct. 18, 2006, which claims the benefit under 35 USC §119(e) of U.S. Provisional Application No. 60/729,234, filed on Oct. 24, 2005, in the US Patent and Trademark Office, and under 35 USC §119(a) of Korean Patent Application No. 10-2006-0053824, filed on Jun. 15, 2006, in the Korean Intellectual Property Office, the entire disclosures of which are hereby incorporated by reference.

BACKGROUND OF THE INVENTION

1. Field of the Invention

The present invention relates to a method and an apparatus of performing tunnel signaling over an IP tunneling path. More particularly, the present invention relates to a method and an apparatus of performing tunnel signaling by generating and transmitting over an IP tunneling path a tunnel signaling flow corresponding to an end-to-end signaling flow.

2. Description of Related Art

As Internet technologies have spread, a next-generation communication network is being developed as an "all-IP" network having a structure to which Internet Protocol (IP)-based core networks and various access networks are integrated. In the all-IP network, a wired network such as public switched telephone network (PSTN) and a wireless network supporting, for example, International Mobile Telecommunication-2000 (IMT-2000) are linked to the IP-based core network to function as one integrated IP network.

Integration of different types of networks frequently occurs between a network supporting an IP version 6 (IPv6) address system used for supporting mobility and quality-of-service (QoS), and a conventional IP version 4 (IPv4) network, as well as between an IP network and a non-IP network. Accordingly, a network linking technology for providing an integrated Internet service through an entire network comprising network apparatuses supporting IPv4 and work apparatuses supporting IPv6 is required.

An IP tunneling technology has been regarded as a technology for achieving the integration between an IP network and a non-IP network or IP networks of different types. IP tunneling indicates an encapsulation method of transmitting a packet via a virtual pipe between two nodes on a network. A packet transmission path between the two nodes is called an IP tunneling path or an IP tunnel. Packets transmitted over the IP tunneling path include conventional data packets and signaling packets containing signaling messages for performing particular operations such as QoS and resource reservation.

Typically, a conventional data packet is transmitted over the IP tunneling path by adding a tunnel IP header to a data packet in a suitable form according to a type of network forming the IP tunneling path. For example, when an IPv6 data packet passes an IP tunneling path operating according to an IPv4 protocol, an IPv4 header including addresses of both end points of the IP tunneling path is added to the IPv6 data packet.

However, the described method has an aspect not suitable for transmitting a signaling packet forming a signaling message associated with maintaining and managing a network. Specifically, according to the described method, it is not possible to reflect an operation associated with the signaling message on the IP tunneling path by dealing with a signaling packet as a conventional data packet. For example, since information associated with operations such as reserving network resources to perform QoS with respect to an IP tunneling path and transmitting a router alert option or a certain protocol number is encapsulated by a tunnel IP header, it is not shown on nodes on the IP tunneling path. Therefore, the described signaling operations may not be performed over the IP tunneling path.

In addition, as in the case of one of the conventional QoS methods, when classifying a data packet transmitted over an IP tunneling path according to a service flow type corresponding to the data packet to perform scheduling for each type, if an IP packet transmitted over the IP tunneling path is encapsulated by a tunnel IP header, the service flow type is not recognized on the IP tunneling path. Therefore, the described signaling operations may not be suitably performed.

On the other hand, a User Datagram Protocol (UDP) header may be added for recognizing a QoS data packet on a tunneling path. However, since the UDP header is relatively large, there is a considerable increase in overhead by adding the UDP header to all packets passing the IP tunneling path. Particularly, this type of tunneling method is not suitable since the overhead due to adding the UDP header becomes larger with respect to a service of transmitting a small packet, such as voice over IP (VoIP).

On the other hand, there has been disclosed a method of recognizing an encapsulated message on an IP tunneling path by encapsulating a packet using a Security Parameters Index (SPI) field of an IP Security (IPSEC) protocol proposed by the Internet Engineering Task Force (IETF) for secure transmission and reception of packets in an IP layer. According to this method, a fine signaling over an IP tunneling path is possible without any overhead due to adding an additional header. However, the method can be applied to only an IP tunneling path supporting the IPSEC protocol.

A conventional resource reservation protocol (RSVP) using the described methods of adding an IP header or an UDP header to an IP packet, or using an IPSEC SPI field cannot effectively support mobility of a host, since the conventional RSVP does not support sender-initiated signaling that will be described later, and does not have consideration for the mobility, for example, a session identifier value varies with handoff of a mobile node.

Accordingly, an interest for a method which can effectively perform tunnel signaling and can support mobility and the QoS has increased.

Since mobile Internet is on the verge of being widely introduced, a method of supporting mobility of Internet apparatuses is enjoying brisk research, however an optimal method of performing tunnel signaling on a mobile IP tunneling path formed of network apparatuses based on a mobile IP has not yet been provided.

Accordingly, in order to solve the above described problem, there is a need for an improved method of effectively performing tunnel signaling, the new method generating a tunnel signaling flow corresponding to an end-to-end signaling flow, and transmitting the generated tunnel signaling flow through an IP tunneling path.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and a configuration of an apparatus using the method which can effectively process a data packet and a signaling packet on an IP tunneling path.

An exemplary embodiment of the present invention also provides a method of performing tunnel signaling over an IP tunneling path which can identify a tunnel signaling message on the IP tunneling path by generating a tunnel signaling flow distinguished from an end-to-end signaling flow, and transmitting the generated tunnel signaling flow through the IP tunneling path.

An exemplary embodiment of the present invention also provides a method and an apparatus using the method of performing tunnel signaling over an IP tunneling path which can support tunnel signaling without an additional packet overhead.

An exemplary embodiment of the present invention also provides a method and an apparatus using the method of performing tunnel signaling over an IP tunneling path which can effectively support tunnel signaling in a mobile IP environment.

According to an aspect of exemplary embodiments of the present invention, there is provided a method of performing tunnel signaling over an IP tunneling path connected to an end-to-end path on an IP network, in which an end-to-end signaling flow is received from a sender or a receiver on the end-to-end path; a tunnel signaling flow is generated corresponding to the received end-to-end signaling flow, and the generated tunnel signaling flow is transmitted through the IP tunneling path; the end-to-end signaling flow is forwarded between an entry node and an exit node of the IP tunneling path; and the forwarded end-to-end signaling flow is transmitted to at least any one node on the end-to-end path, wherein the forwarding is simultaneously performed with the transmitting of the tunnel signaling flow, and the transmitting of the end-to-end signaling flow is suspended until the transmitting of the tunnel signaling flow is completed.

According to another aspect of exemplary embodiments of the present invention, there is provided a network apparatus performing tunnel signaling over an IP tunneling path, the network apparatus, in which an end-to-end interface transmits and receives an end-to-end signaling flow through an end-to-end path connected to the IP tunneling path; a tunnel interface transmits and receives a tunnel signaling flow through the IP tunneling path; a tunnel signaling performing unit performs operations associated with a tunnel signaling message, by referring to the tunnel signaling message included in the tunnel signaling flow; and a tunnel signaling control unit generates the tunnel signaling flow corresponding to the end-to-end signaling flow and controls tunnel signaling over the IP tunneling path, wherein the tunnel signaling control unit includes a flow generation unit for generating the tunnel signaling flow; and a flag management unit for maintaining flag values controlling the tunnel signaling.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
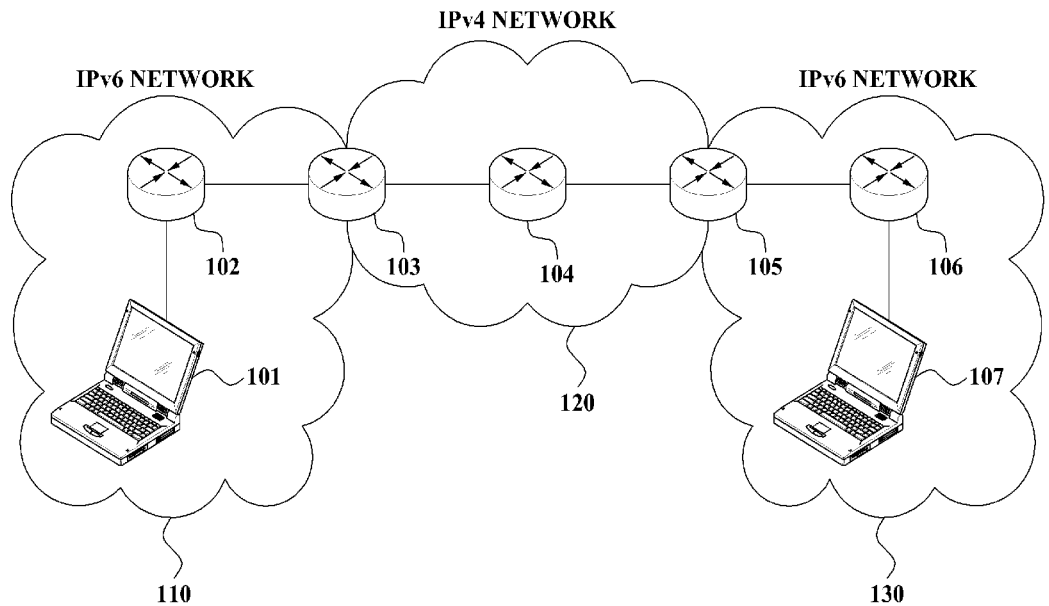
FIG. 1 is a diagram illustrating an example of a network to which a method of performing tunnel signaling according to an exemplary embodiment of the present invention is applied.

FIG. 1 is a diagram briefly illustrating an exemplary embodiment of a network to which a method of performing tunnel signaling, according an exemplary embodiment of the present invention, is applied. The network has a structure formed of end-to-end paths 110 and 130 and an IP tunneling path 120, the end-to-end paths 110 and 130 operating according to an IPv6 protocol and the IP tunneling path 120 operating according to an IPv4 protocol.

As illustrated in FIG. 1, the IP tunneling path 120 includes a tunnel entry node 103, a tunnel exit node 105 and at least one intermediate node 104. The tunnel entry node 103 allows a packet transmitted from a sender 101 of end-to-end paths 110 and 130 to enter into the IP tunneling path 120, the tunnel exit node 105 releases the packet transmitted through the IP tunneling path 120 to transmit to a receiver 107 of the end-to-end paths 110 and 130, and the at least one intermediate node 104 transmits a data packet or a signaling packet between the tunnel entry node 103 and the tunnel exit node 105. An end-to-end path and IP tunneling path to which the present invention is applied may be formed of a network respectively supporting the IPv4 or IPv6 protocols, however end-to-end paths supporting the IPv4 protocol and IP tunneling path supporting the IPv6 protocol are illustrated in FIG. 1 as a non-limiting example for ease of description. Furthermore, the present invention may be widely applicable to a mobile IPv4 network in which the end-to-end path and IP tunneling path operate on a basis of an IP network, a mobile IPv6 network, and other possible types of different IP networks.

Figure 2:
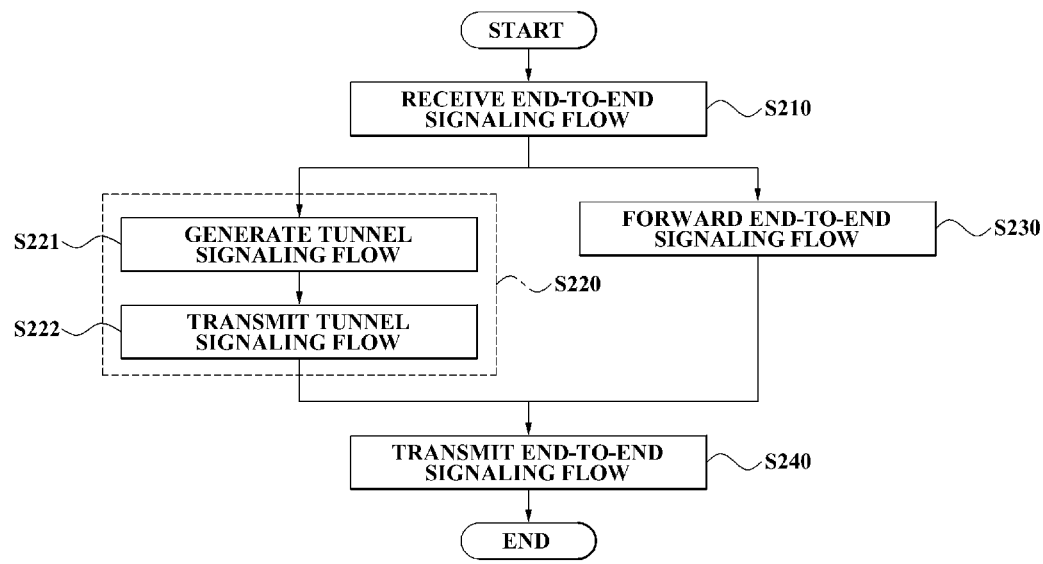
FIG. 2 is a flowchart illustrating a method of performing tunnel signaling according to an exemplary embodiment of the present invention.

FIG. 2 is a flowchart illustrating a method of performing tunnel signaling through an IP tunneling path according to an exemplary embodiment of the present invention.

Referring to FIG. 2, the method of performing tunnel signaling according to the present invention includes step S210, that is, receiving an end-to-end signaling flow. The end-to-end signaling flow received by step S210 may be a signaling flow received from a sender 101 through the end-to-end path 110 of FIG. 1, or may be a signaling flow received from a receiver 107 through the end-to-end path 130 of FIG. 1.

In this case, the signaling flow indicates packets including a signaling message, and the signaling message indicates a message transmitted between network configuration elements, for performing signaling. The terminology 'signaling' used in the specification may be applicable to general operations of exchanging control information with respect to operation or management of a network apparatus, including general data, between network configuration elements. For example, the signaling may include exchanging of control information associated with a network security or operations associated with reservation, modification and release of network resources for performing Quality of Service (QoS) and the like. Hereinafter, the signaling will be mainly described from a viewpoint of the QoS and the resource reservation, however the present invention may not be limited to certain exemplary embodiments as described below since the present invention is applicable to general signaling. The signaling flow in the specification indicates an end-to-end signaling flow or a tunnel signaling flow. The end-to-end signaling flow indicates a signaling flow transmitted between the sender 110 and the receiver 107. Network ends includes the sender 110 and the receiver 107 through the end-to-end paths 110 and 130. End-to-end paths in a broad sense indicate an entire network path connecting the sender 110 and the receiver 107, however the end-to-end paths used in the specification may indicate paths, excluding the IP tunneling path 120, of the entire network path. The tunnel signaling flow may indicate a signaling flow transmitted between the tunnel entry node 103 (referred to as 'entry node') and the tunnel exit node 105 (referred to as 'exit node') of the IP tunneling path 120. In order to properly provide an end-to-end service, a signaling message is required to be processed at nodes 102 and 106 on the end-to-end path, and also nodes 103, 104 and 105 on the IP tunneling path 120. However, the end-to-end signaling flow may not be processed at the nodes 103, 104 and 105 on the IP tunneling path 120 since the IP tunneling path 120 is formed of a different network between the end-to-end paths 110 and 130.

Accordingly, the method of performing tunnel signaling of an exemplary embodiment of the present invention includes generating a tunnel signaling flow corresponding to the end-to-end signaling flow received through step S210, and step S220, that is, transmitting the generated tunnel signaling flow through the IP tunneling path.

Step S220 includes steps S221 and S222, step S221 generating the tunnel signaling flow which will be given to each tunnel signaling flow and step S222 transmitting the generated tunnel signaling flow through the IP tunneling path.

In step S221, a typical tunnel flow identifier of the tunnel signaling flow may be generated, a correlation between the tunnel signaling flow and the end-to-end signaling flow may be stored by using the tunnel flow identifier.

For example, in step S221, a tunnel data object may be generated, the tunnel data object storing a session identifier with the tunnel signaling flow in a service session associated with the end-to-end signaling flow corresponding to the generated tunnel signaling flow. The session identifier is a typical identifier of a service session associated with the end-to-end signaling flow and identifies a transmitted end-to-end signaling flow for smoothly providing a service based on an end-to-end connection.

A tunnel flow identifier, stored with the session identifier, is a typical identifier of the tunnel signaling flow, and the tunnel flow identifier is updated or newly generated when a configuration of the IP tunneling path 120 is changed, that is, when one or both of the entry node 103 and the exit node 105 are changed. Namely, the tunnel flow identifier may change its value according to address information of the IP tunneling path 120, and conversely, the session identifier is maintained as an identical value while an end-to-end service session is continued.

In the method of performing tunnel signaling of an exemplary embodiment of the present invention, seamless end-to-end signaling may be smoothly provided in a mobile IP environment, for example a portable Internet system supporting a mobile IP network, since the end-to-end signaling flow is separated from the tunnel signaling flow by distinguishing the session identifier from the tunnel flow identifier. Applications of the IP environment of the present invention will be described in detail later.

In the method of performing tunnel signaling of an exemplary embodiment of the present invention, a signaling message may be identified at each node on the IP tunneling path without increasing overhead, of an additional UDP header, conversely a conventional tunneling method is applied to a general data flow. For example, in the method of performing tunnel signaling of an exemplary embodiment of the present invention, a high quality service may be provided to a user since the end-to-end QoS, with respect to a multimedia application service, is supported with a type being suitable for a multimedia application, by reducing the packet overhead.

In step S222, the tunnel signaling is performed by transmitting the tunnel signaling flow generated by step S221 through the IP tunneling path. Step S222 transmits the tunnel signaling flow to at least one node on the IP tunneling path, that is, to a network apparatus having a packet routing function. The at least one node receiving the tunnel signaling flow identifies a tunnel signaling message included in the tunnel signaling flow and performs an operation as ordered by the tunnel signaling message. When the tunnel signaling message includes an order associated with updating of a packet class table for the QoS, the at least one node may update the packet class table using information included in the tunnel signaling message, and when the tunnel signaling message includes an order associated with releasing of a network resource, the at least one node may releases the network resource and resets an internally established timer.

The method of tunnel signaling according to an exemplary embodiment of the present invention includes step S230 that performs forwarding of the end-to-end signaling flow received in step S210 from an entry node to an exit node on the IP tunneling path. The end-to-end signaling flow is processed at nodes 102 and 106 on the end-to-end path, except for the IP tunneling path, and includes a signaling message for providing the nodes 102 and 106 on the end-to-end path with the end-to-end signaling. Subsequently, the end-to-end signaling flow is forwarded and is between the entry node 103 and the exit node 105 and transmitted to the nodes 102 and 106 on the end-to-end path to be processed, instead of being processed at an intermediate node 104 on the IP tunneling path.

In step S240, the entry node 103 or the exit node 105, receives the forwarded signaling flow, and transmits the end-to-end signaling flow through the end-to-end path.

As an example, when step S210 is performed by the entry node 103, the end-to-end signaling flow is forwarded from the entry node 103 to the exit node 105 in step S230, and step S240 is performed by the exit node 105, and when step S210 is performed by the exit node 105, the end-to-end signaling flow is forwarded from the exit node 105 to the entry node 103 in step S230, and step S240 is performed by the entry node 103.

The method of performing tunnel signaling may be divided into a sequential signaling and a parallel signaling according to a temporal order between the transmitting of the tunnel signaling flow and the transmitting/forwarding of the end-to-end signaling flow.

The sequential signaling indicates a signaling scheme in which the transmitting of the tunnel signaling flow and the forwarding of the end-to-end signaling flow are synchronized, that is, one signaling flow is suspended until the other signaling flow is completed.

On the other hand, the parallel signaling indicates a signaling scheme in which the transmitting of the tunnel signaling flow and the forwarding of the end-to-end signaling flow are not synchronized, that is, both transmitting and forwarding are simultaneously performed.

In the method of performing tunnel signaling according to the present invention, step S230 starts the forwarding of the end-to-end signaling flow before step S220 of the transmitting of the generated tunnel signaling flow through the IP tunneling path is completed, and step S240 of the transmitting of the end-to-end signaling flow is suspended until step S220 is completed.

Namely, the nodes transmitting the tunnel signaling flow and forwarding the end-to-end signaling flow between the entry node 103 and the exit node 105 operate according to the parallel signaling, and other nodes transmitting the end-to-end signaling flow from the IP tunneling path to other paths operate according to the sequential signaling, that is, transmit the end-to-end signaling flow after the tunnel signaling is completed.

Also, the method of performing tunnel signaling according to an exemplary embodiment of the present invention may be divided into sender-initiated signaling and receiver-initiated signaling, depending upon a flow of a message transmitted through the IP tunneling path and the end-to-end path.

The sender-initiated signaling indicates the end-to-end signaling or the tunnel signaling is performed in a way that the transmitting of the signaling message starts from the sender 101 or the entry node 103, and the receiver 107 or the exit node 105 receives a signaling response message generated by corresponding to the signaling message.

The receiver-initiated signaling indicates the end-to-end signaling or the tunnel signaling is performed in a way that the transmitting of the signaling message starts from the receiver 107 or the exit node 105, and the sender 101 or the entry node 103 receives a signaling response message generated by corresponding to the signaling message. For the above described operation, the sender 101 or the entry node 103 requests for beginning of the transmitting of the signaling message by transmitting an end-to-end or a tunnel signaling query message to the receiver 107 or the exit node 105.

In the method of performing tunnel signaling according to an exemplary embodiment of the present invention, while the end-to-end signaling is performed according to the receiver-initiated signaling, the tunnel signaling is performed according to the sender-initiated signaling.

Figure 3:
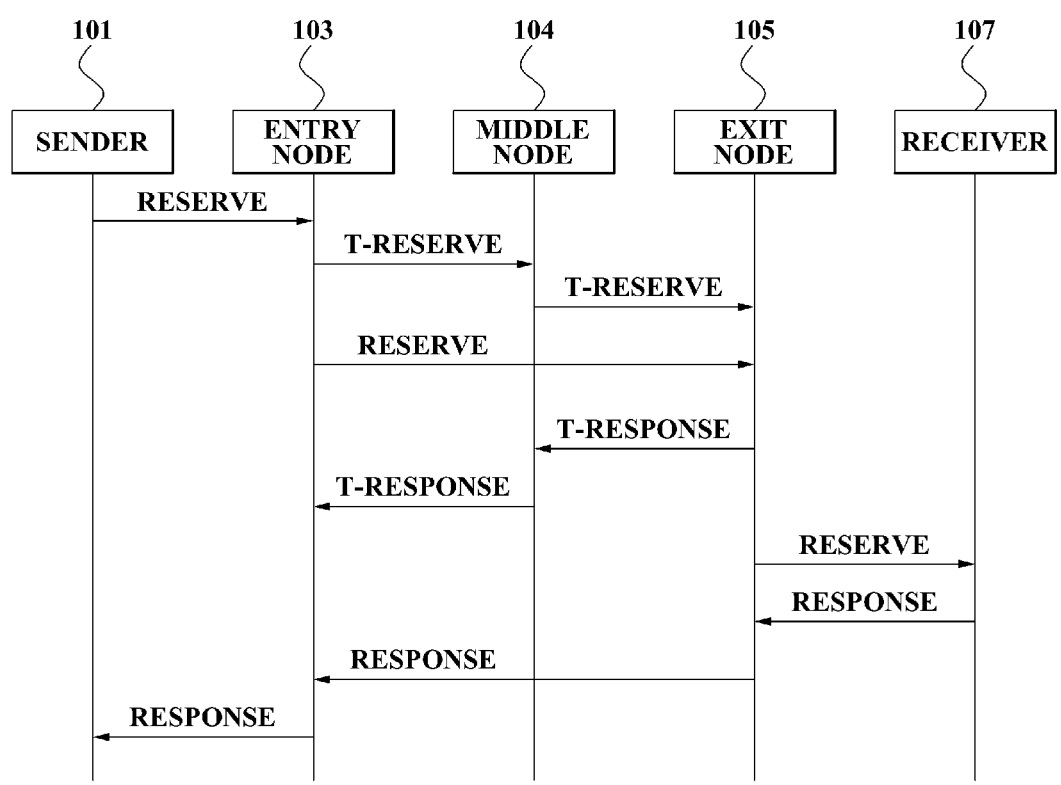
FIG. 3 is a message flow diagram illustrating a flow of a message between network apparatuses for performing tunnel signaling according to an exemplary embodiment of the present invention.
Figure 4:
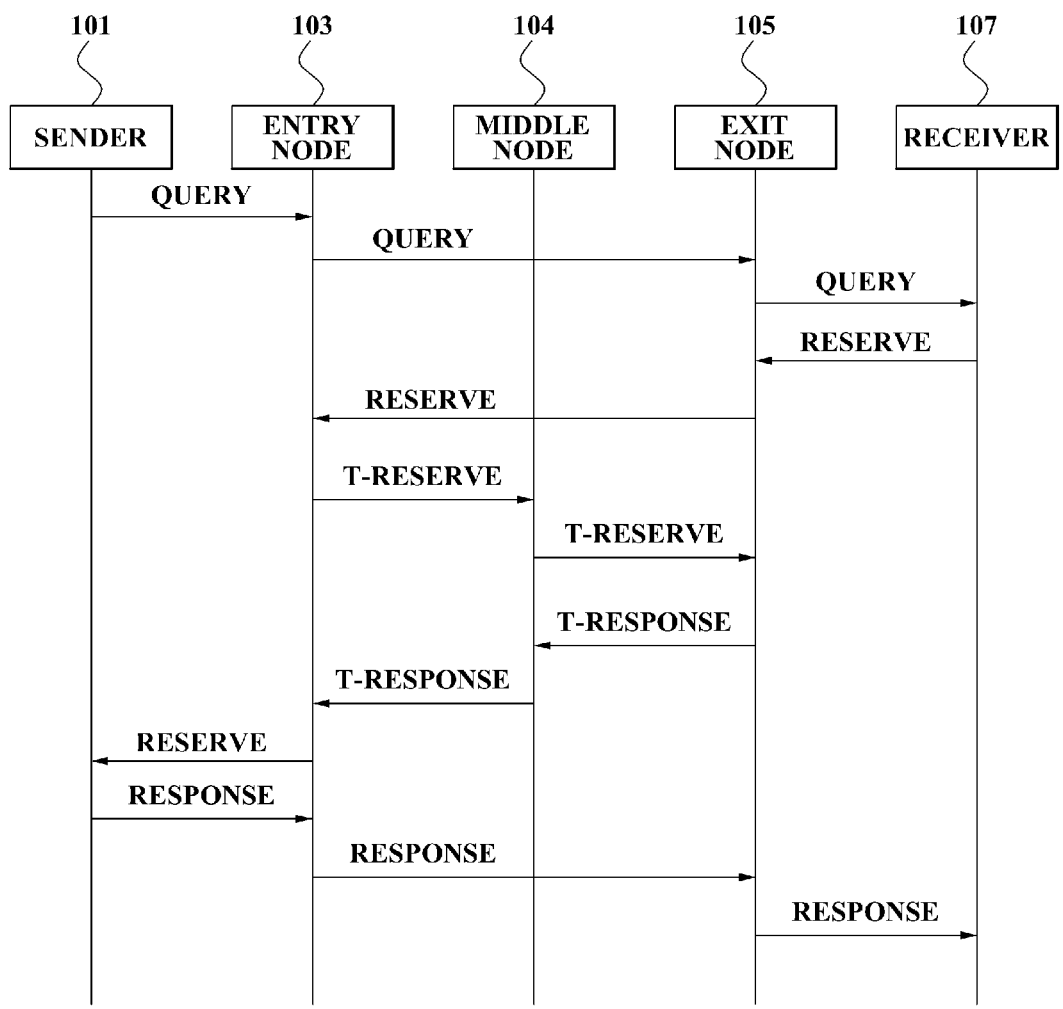
FIG. 4 is a message flow diagram illustrating a flow of a message between network apparatuses for performing tunnel signaling according to an exemplary embodiment of the present invention.

FIGS. 3 and 4 are message flow diagrams illustrating a flow of a message between network apparatuses for performing tunnel signaling according to exemplary embodiments of the present invention. According to the exemplary embodiments, the node transmitting the tunnel signaling flow performs according to the parallel signaling, and the node transmitting the end-to-end signaling flow performs according to the sequential signaling.

FIG. 3 is a diagram illustrating an exemplary embodiment in which both of the end-to-end path and the IP tunneling path operates according to the sender-initiated signaling.

For reference, although the tunnel signaling message and the end-to-end signaling message are used as network resource reservation messages in the specification, the signaling message of the present invention is not limited to the network resource reservation messages. Subsequently, a network resource reservation message may be replaced with a tunnel signaling message, a resource reservation response message may be replaced with a tunnel signaling response message, which will be applicable to general tunnel signaling.

Referring to FIG. 3, an entry node 103 receives a "RESERVE" of an end-to-end resource reservation message from a sender 101, generates a "T-RESERVE" of a tunnel resource reservation message, and transmits the "T-RESERVE" to an exit node 105 of FIG. 1, passing though a middle node 104 on the IP tunneling path.

Forwarding the "RESERVE" of the end-to-end resource reservation message from the entry node 103 to the exit node 105 is performed in parallel with transmitting the "T-RESERVE" of the tunnel resource reservation message, generated from the entry node 103 in response to the "RESERVE", passing through the middle node 104 to the exit node 105.

As described above, in the exit node 105, the transmitting of the end-to-end signaling is suspended until the tunnel signaling over the IP tunneling path is completed.

As soon as a "T-RESPONSE" of a tunnel signaling response message generated in response to the "T-RESERVE" is transmitted from the exit node 105 to the entry node 103, the forwarded end-to-end reservation message is transmitted through the end-to-end path.

The "RESPONSE" of the end-to-end resource reservation response message generated from a receiver 107, in response to the receiving of the "RESERVE" message, is transmitted to the exit node 105, is then forwarded from the exit node 105 to the entry node 103 through the IP tunneling path, and finally transmitted to the sender 101.

As described above, since the transmitting of the signaling flow operates according to the parallel signaling at the entry node 103 and the transmitting of the end-to-end signaling flow operates according to the sequential signaling at the exit node 105, merits of the parallel signaling and the sequential signaling may be combined.

The sequential signaling may provide a hard QoS, that is, a constantly maintained higher level of QoS, and may reduce signaling complexity. However a problem exists in a signaling delay. The parallel signaling may enable a quick signaling, however the hard QoS may not be provided.

When the sequential signaling is applied at the node transmitting the forwarded end-to-end signaling flow to outside of the IP tunneling path, and the parallel signaling is applied at the node generating and transmitting the tunnel signaling flow, a QoS is maintained as high as a level of hard QoS with respect to an entire path between the sender 101 and the receiver 107, the signaling complexity may be reduced, and the signaling delay may be minimized.

FIG. 4 is a message flow diagram illustrating a flow of a message in a method of performing tunnel signaling according to an exemplary embodiment of the present invention. An end-to-end path operates according to the receiver-initiated signaling, the IP tunneling path operates according to the sender-initiated signaling.

Referring to FIG. 4, a query of an end-to-end resource reservation query message, transmitted from the sender 101 through the end-to-end path to the entry node 103, is forwarded from the entry node 103 to the exit node and transmitted to the receiver 107. The receiver 107 receiving the query transmits a "RESERVE" of an end-to-end resource reservation message to the exit node 105, and the exit node 105 forwards the "RESERVE" to the entry node 103.

Since the method of performing tunnel signaling of an exemplary embodiment of the present invention operates according to the sender-initiated signaling on the IP tunneling path, the entry node 103 transmits a "T-RESERVE" of the tunnel resource reservation message to the exit node 105, passing through at least one node on the IP tunneling path, instead of repeatedly generating the "T-QUERY" of the tunnel resource reservation message. The exit node 105 transmits the "T-RESPONSE" of the tunnel resource reservation response message, generated in response to the "T-RESERVE" of the tunnel resource reservation message, to the entry node 103, passing through the middle node 104.

When the resource reservation with respect to the IP tunneling path signaling is completed, the "RESERVE" of the end-to-end resource reservation message being suspended at the entry node 103 is transmitted from the entry node 103 to the sender 101 through the end-to-end path. The sender 101 transmits a "RESPONSE" of an end-to-end resource reservation response message to the entry node 103, the entry node 103 forwards the received "RESPONSE" message to the exit node 105 and the exit node 105 transmits the "RESPONSE" message to the receiver 107 through the end-to-end path.

As described above, a signaling delay on the IP tunneling path and a signaling delay on an entire path connecting the sender 107 to the receiver 107 may be minimized since the signaling over the end-to-end path is performed according to the receiver-initiated signaling, and the tunnel signaling over the IP tunneling path is performed according to the sender-initiated signaling.

Since a broadly used resource reservation protocol (RSVP) supports the receiver-initiated signaling, when the RSVP is applied to the entire path as the present invention suggests, when the tunnel signaling according to the sender-initiated signaling is performed with respect to the IP tunneling path, an exemplary embodiment of the present invention may reduce the signaling delay with respect to the entire path. For example, when the IP tunneling path occupies a main proportion of the entire path, an exemplary embodiment of the present invention may dramatically reduce the signaling delay.

The present invention provides a proper method of performing tunnel signaling for a mobile IP environment requesting a short signaling delay. When a sub-network to which a mobile node (MN) is connected is changed by a hand-off of a terminal, and thereby an IP tunneling path taking the MN as an end point changes, a tunnel signaling over the newly formed IP tunneling path may be performed immediately, guaranteeing a continuity of a service provided to a MN through the IP tunneling path.

Figure 5:
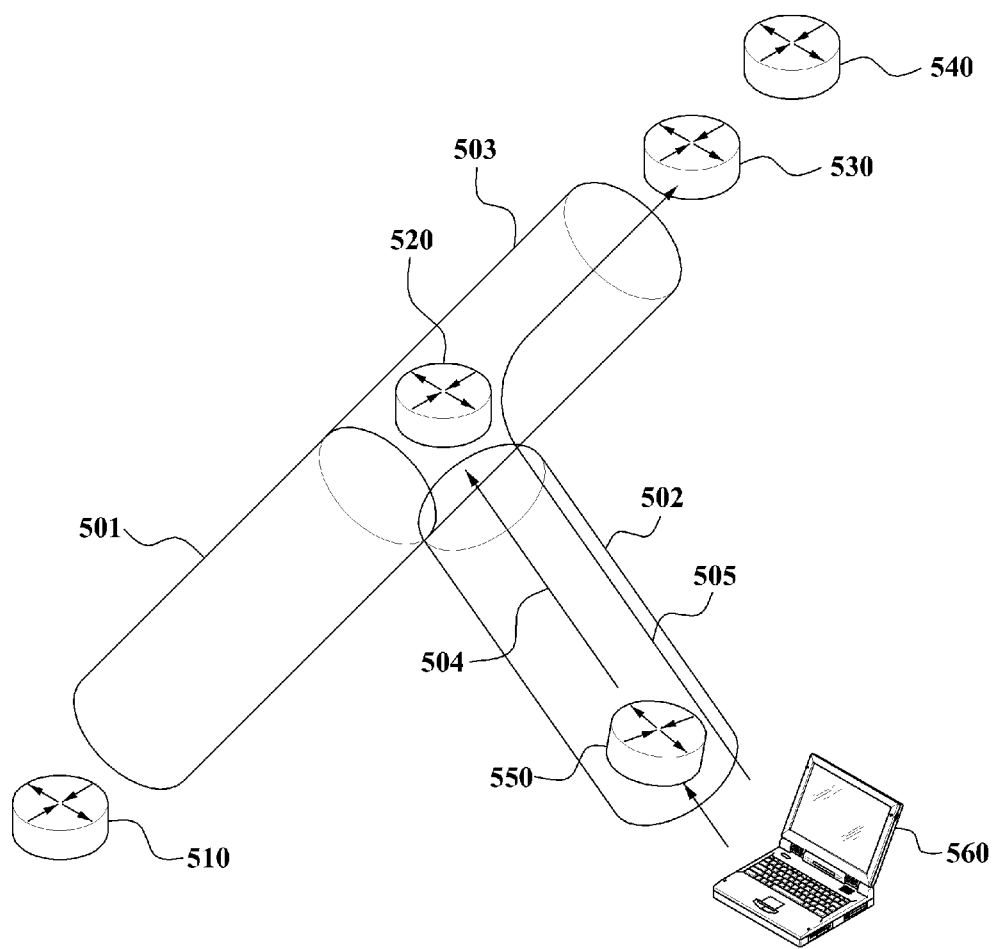
FIG. 5 is a diagram illustrating a flow of a crossover node discovery message on a mobile IP environment according to an exemplary embodiment of the present invention.

FIG. 5 is a diagram illustrating a flow of a crossover node discovery message on a mobile IP environment according to an exemplary embodiment of the present invention. For reference, the mobile IP environment according to the present invention may include any type of mobile IP environment, for example, a mobile IPv4, a mobile IPv6 and the like, supporting mobility in association with other IP environments.

As illustrated in FIG. 5, when an MN 560, connected to a home network through an old access router 510, moves to a foreign network and is connected to a new access router 550, a partial section of the IP tunneling path, connecting the MN 560 to a home agent (HA) 530, changes. When a local tunneling path, which is no longer used due to the IP tunneling path having been changed, is taken as an old tunneling path 501, and when a tunneling path which is newly used is taken as a new tunneling path 502, a common node between the old tunneling path 501 and the new tunneling path 502 may be taken as a crossover node (CRN) 520.

In the mobile IPv4, a foreign agent (FA) giving a care-of-address to the MN 560 and transferring the care-of-address to the HA 530 when the MN 560 is out of the home network and accessing an external network is required, and the FA may become an entry node or an exit node which connects the MN 560 and the HA 530. However, for simplicity of description, the FA will not be additionally mentioned with respect to the present invention.

When a part of the IP tunneling path changes, the MN 560 may release a reservation of a network resource on the old tunneling path 501, and perform tunnel signaling to reserve a network resource on the new tunneling path 502. For reference, according to a reverse tunneling embodiment illustrated in FIG. 5, in which the MN 560 begins a tunnel signaling over an IP tunneling path connecting the MN 560 and the HA 530, MN 560 may begin immediately after the IP tunneling path changes, thereby more surely guaranteeing a continuity of the service session. And this feature more effectively supports a mobile IP environment.

Also, when the tunnel signaling is performed according to the reverse tunneling method illustrated in FIG. 5, a problem of a triangle routing in association with the mobile IPv4 may not occur. For example, when the network resource is reserved according to the RSVP protocol, and when the MN 560 directly transmits a resource reservation query message to a corresponding node (CN) 540, a resource reservation message is transmitted from the CN 540 to a changed address of the MN 560, passing through the HA 530. Subsequently, a problem may occur in which a data flow may be transmitted to a path where the network resource is not reserved since a path from the MN 560 to the CN 540 is not consistent with a path from the CN 540 to the MN 560.

When the tunnel signaling is performed according to the reverse tunneling method illustrated in FIG. 5, the MN 560, that is, a sender, gives a source address and a destination address of the tunnel signaling flow. This helps a transmitting path between a resource reservation query message and a resource reservation message to be consistent, or a transmitting path between a resource reservation message and a resource reservation response message to be consistent, subsequently the problem of the triangle routing being solved.

Also, when the tunnel signaling is performed according to the reverse tunneling method illustrated in FIG. 5, a case where an ingress filtering error in which a packet transmitted from an MN is determined to be an unauthorized packet and is blocked by a node located on an optimized route when route optimization is applied in the mobile IPv6, may be effectively overcome.

Accordingly, according to the method of performing tunnel signaling, the problem of the conventional art may be solved since the MN 560 becomes both the sender and the entry node, the CN 540 becomes the receiver, and the tunnel signaling flow is generated by the mobile terminal 560 and the departure and the destination addresses on the IP tunneling path are given by the mobile mode 560.

Again referring to FIG. 5, the MN 560 transmits the tunnel signaling flow through the intermediate node 520 to the HA 530. When the IP tunneling path operates according to the receiver-initiated signaling, the HA 530 transmits a resource reservation message in response to a resource reservation query message transmitted by the MN 560, a result of performing a resource reservation signaling is transmitted, in a type of a resource reservation response message, from the MN 560 to the HA 530.

When the IP tunneling path operates according to the sender-initiated signaling, the MN 560 transmits, in response to the resource reservation message, a resource reservation message to the HA 530, receives a resource reservation response message from the HA 530, and subsequently the resource reservation signaling is performed.

The MN 560 searches the CRN 520 to release a resource on the old tunneling path 501. According to an exemplary embodiment of the present invention, the CRN 520 may be discovered by transmitting/forwarding the tunnel signaling flow 504 and the end-to-end signaling flow 505.

In this case, a problem that the CRN 520 is repeatedly discovered, while the signaling flows are exchanged through the IP tunneling path, may occur. In order to solve the problem, according to an exemplary embodiment of the present invention, the CRN 520 is not searched when a predetermined discovery flag value is configured by configuring the predetermined discovery flag value for the end-to-end signaling flow 505 and the tunnel signaling flow 504.

Since the tunnel signaling flow 504 may be identified at the CRN 520 located on the IP tunneling path, the configuring of the predetermined discovery flag value is performed at the CRN 520 discovered by the tunnel signaling flow 504.

The discovery flag may not be configured by the CRN 520 since the CRN 520 located on the IP tunneling path simply forwards the end-to-end signaling flow 505, subsequently the discovery flag included in the end-to-end signaling flow 505 is performed by the HA 530 located at the exit node on the IP tunneling path.

According to an exemplary embodiment of the present invention, since an additional message is not required to transmit in order to release a resource on the old tunneling path 501, an operation of releasing the network resource may be simplified. In an exemplary implementation, the old tunneling path 501 may be released by configuring a predetermined resource release flag for the resource reservation message transmitted from the HA 530 or the MN 560, without transmitting the additional message for releasing the network resource.

Figure 6:
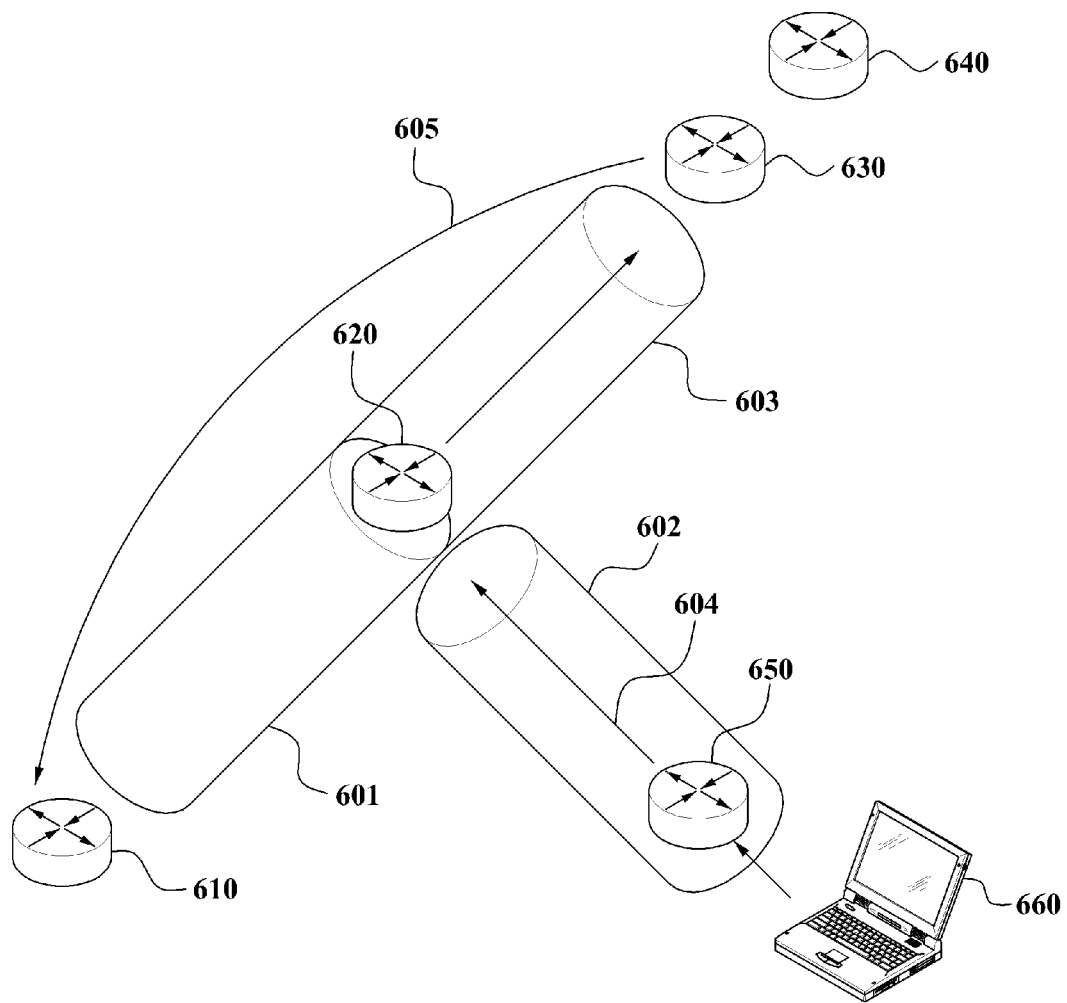
FIG. 6 is a diagram illustrating a flow of a network resource release message according to an exemplary embodiment of the present invention.

FIG. 6 is a diagram illustrating a flow of a network resource release message according to an exemplary embodiment of the present invention. Referring to FIG. 6, when a CRN 620 is discovered by a tunnel signaling flow 604 transmitted in a new tunneling path 602 from a MN 660, connected to a home network through an old access router 510, and when the tunnel signaling flow 604 configured with a discover flag is transmitted to a HA 630, the HA 630 configures a resource release flag and transmits a tunnel signaling message to nodes on an old tunneling path 601.

When the IP tunneling path operates according to the receiver-initiated signaling, the CRN 620 discovered by a resource reservation query message 604, which is transmitted from the MN 660, transmits the resource reservation query message 604 configured with a discover flag value to the HA 630, and the HA 630, in response to the received resource reservation query message 604, transmits a resource reservation message 605 configured with a resource release flag value to the MN 660 through the CRN 620.

In this case, the CRN 620 transmits the resource reservation message 605 to the nodes on the old tunneling path 601 to release a tunneling resource which is no longer used. The old tunneling path 601 that received the resource reservation message 605 may release an end-to-end signaling state or a tunnel signaling state, configured with respect to the nodes on the old tunneling path 601, by referring to a release flag value.

Also, the nodes on the old tunneling path 601 may perform the releasing of the end-to-end signaling or a tunnel signaling states when a typical tunnel flow identifier value of the tunnel signaling flow 604 is changed. For example, when the tunnel flow identifier value is exclusively changed while a session identifier value of a service session associated with an end-to-end signaling flow is being fixed, the IP tunneling path is determined to be changed by a hand-off, and subsequently the releasing of the end-to-end signaling or a tunnel signaling state may be performed.

In the method of performing tunnel signaling according to an exemplary embodiment of the present invention, reservation of network resources between the HA 630 and a correspondence node 640 may be not duplicated when the network resource reservation is required to be performed again since the IP tunneling path changes due to handoff. Also, a problem of service delay that may occur due to performing unnecessary resource reservation may be mitigated.

The method of performing tunnel signaling according to an exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The present invention may also be applied to a network apparatus performing tunnel signaling through an IP tunneling path.

Figure 7:
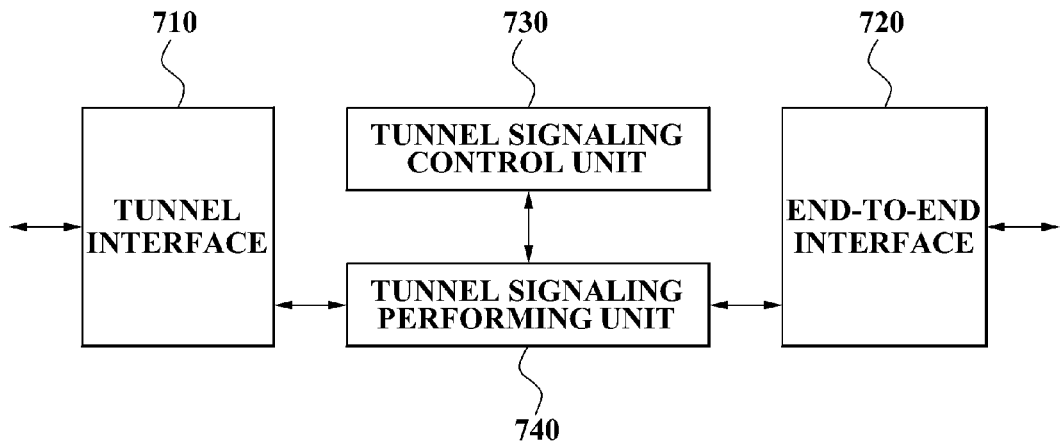
FIG. 7 is a block diagram illustrating an inner configuration of a network apparatus having a tunnel signaling functionality according to an exemplary embodiment of the present invention.

FIG. 7 is a block diagram illustrating an inner configuration of a network apparatus having a tunnel signaling function according to an exemplary embodiment of the present invention.

A tunnel interface 710 in FIG. 7 is a component of the network apparatus for transmitting and receiving a tunnel signaling flow through the IP tunneling path. The tunnel interface 710 connects the network apparatus according to an exemplary embodiment of the present invention with the IP tunneling path.

An end-to-end interface 720 transmits and receives an end-to-end signaling flow through, and connects the network apparatus according to the present invention with an end-to-end path. When the network apparatus according to the present invention is located at an entry node 103, the end-to-end interface 720 transmits a data flow or an end-to-end signaling flow to a sender 101 or receives from the sender 101. Also, when the network apparatus according to the present invention is located at an exit node 105, the end-to-end interface 720 transmits the data flow or the end-to-end signaling flow to a receiver 107 or receives from the receiver 107.

The tunnel interface 710 and the end-to-end interface 720 are respectively formed of a network interface having a function of processing the data flow or the signaling flow, according to any one address system of IPv4, IPv6, mobile IPv4 and mobile IPv6.

A tunnel signaling performing unit 740 performs operations of a proper signaling, according to a signaling message included in the tunnel signaling flow may include, for example, a logic extracting a signaling message, a logic circuit reading the signaling message and a logic circuit updating QoS information and resource reservation information of the network apparatus according to the signaling message.

A tunnel signaling control unit 730 controls the tunnel interface 710, the end-to-end interface 720 and the tunnel signaling performing unit 740 of components of the network apparatus according to the present invention.

Also, the tunnel signaling control unit 730 generates a tunnel signaling message for signaling over the IP tunneling path, and for the operation, the tunnel signaling control unit 730 has an inner configuration as described below.

Figure 8:
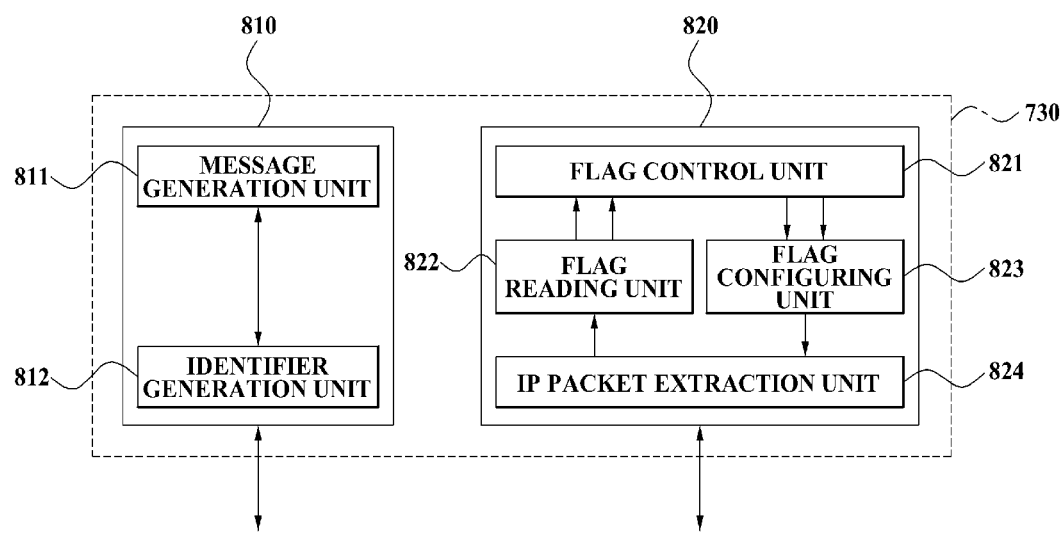
FIG. 8 is a block diagram illustrating an inner configuration of a tunnel signaling control unit of FIG. 7.

FIG. 8 is a block diagram illustrating an inner configuration of the tunnel signaling control unit 730 of FIG. 7. As illustrated in FIG. 8, the tunnel signaling control unit 730 of FIG. 7 includes a flow generation unit 810 generating a tunnel signaling flow, and a flag management unit 820 maintaining flag values controlling the tunnel signaling.

The flag generation unit 810 further includes a message generation unit 811 and an identifier generation unit 812. The flag generation unit 810 generates a signaling message of the tunnel signaling flow by referring to a signaling message included in an end-to-end signaling flow received by the end-to-end interface 720. As an example, the signaling message of the tunnel signaling flow may be generated by duplicating a signaling message of an end-to-end signaling flow.

As an example, the tunnel signaling message includes a QoS message associated with QoS over an IP tunnel path, a network resource reservation message reserving, changing, or releasing a network resource required in performing the QoS, and a network security message indicating an operation over the IP tunneling path, associated with security of a data flow transmitted over the IP tunneling path.

The identifier generation unit 812 generates a tunnel flow identifier associated with the tunnel signaling flow. The tunnel flow identifier may be newly generated or changed when the IP tunneling path changes, and may be stored with a session identifier of a service session associated with the end-to-end signaling flow, in a predetermined data object by using the tunnel flow identifier.

The flag management unit 820 includes an IP packet extraction unit 824 extracting an IP packet from the tunnel signaling flow or the end-to-end signaling flow.

The flag reading unit 822 reads a flag value associated with the tunnel signaling from a predetermined data field of the IP packet.

A flag control unit 821 controls transmitting or receiving of the tunnel signaling flow by referring to the read flag value. For example, the flag control unit 821 may perform releasing of a tunnel signaling state or an end-to-end signaling state of the network apparatus of the present invention, or perform configuring or modifying of the flag value.

The flag control unit 821 transmits the flag value to be configured or modified, to a flag configuration unit 823. The flag configuring unit 823 receiving the flag value may configure or modify the flag value to be stored in the predetermined data field of the IP packet.

The network apparatus according to the present invention may include a wireless network apparatuses such as an access control router (ACR) and a Gateway General Packet Radio Service Support Node (GGSN) in addition to a router and terminal operating in a wired IP network.

As described above, the network apparatus including IP tunnel signaling function, according to an exemplary embodiment of the present invention has been described with reference to FIGS. 7 and 8. Since the detailed contents of the exemplary embodiments previously described with reference to FIGS. 1 through 6 may be applied to the network apparatus, a description of detailed content associated with the present network apparatus will be omitted for clarity and conciseness.

According to the exemplary embodiments of the present invention, there is provided a method of tunnel signaling over an IP tunneling path which can identify a tunnel signaling message on the IP tunneling path by generating a tunnel signaling flow distinguished from an end-to-end signaling flow, and transmitting the generated tunnel signaling flow through the IP tunneling path. Subsequently, an end-to-end path, and also on the IP tunneling path, operations according to signaling messages may be performed so that an end-to-end signaling in a true sense of the term may be provided.

Also, according to exemplary embodiments of the present invention, when a hand-off of an MN supporting a mobile IP occurs, a value of a session identifier is constantly maintained while a service session is continued so that mobility of a host may be effectively supported.

Also, according to exemplary embodiments of the present invention, tunnel signaling is performed according to parallel signaling at an entry node on an IP tunneling path, tunnel signaling is performed according to sequential signaling at an exit node on an IP tunneling path so that a signaling delay may be reduced and a high QoS is provided.

Also, according to exemplary embodiments of the present invention, when an end-to-end signaling operates according to receiver-initiated signaling, sender-initiated signaling is adopted on an IP tunneling path, so that a signaling delay may be reduced and a quality of an end-to-end service may be improved.

Also, according to exemplary embodiments of the present invention, an effectiveness of tunnel signaling may be improved by configuring a predetermined flag value to prevent from duplicating crossover nodes occurring from a hand-off of an MN.

Also, according to exemplary embodiments of the present invention, there is provided an effective method which can release resources of network devices on an IP tunneling path prior to a hand-off, without using an additional release message, while a resource reservation according to a hand-off of an MN on a mobile IP environment is being performed.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of processing a signaling flow of an Internet Protocol (IP) network that has an IP tunneling path connected to an end-to-end signaling flow, the method comprising:
    generating a tunnel signaling flow corresponding to the end-to-end signaling flow of an end-to-end path;
    transmitting the generated tunnel signaling flow to at least one node on the IP tunneling path, the at least one node on the IP tunneling path performing a tunnel signaling in response to receiving the tunnel signaling flow;
    forwarding the end-to-end signaling flow to an exit node of the IP tunnel path;
    receiving an end-to-end signaling response corresponding to the end-to-end signaling flow from the exit node, the end-to-end signaling response generated based on a completion of tunnel signaling;
    searching for a crossover node (CRN) generated by a hand-off of a mobile node (MN); by using a query message transmitted from the MN or a reserve message transmitted from the MN;
    transmitting a tunnel signaling message including a release flag to at least one node on a local tunneling path, of the IP tunneling path, connecting the MN with the CRN prior to the hand-off; and
    releasing at least one of an end-to-end signaling state and a tunnel signaling state of the CRN by referring to the release flag,
    wherein a correspondence relationship between the tunnel signaling flow and the end-to-end signaling flow is stored,
    wherein a timer of the at least one node on the local tunneling path is varied after the releasing.

2. The method of claim 1, wherein the transmitting of the tunnel signaling flow comprises:
    transmitting a tunnel signaling message to the exit node through the intermediate node on the IP tunneling path; and
    receiving a tunnel signaling response message corresponding to the tunnel signaling message through the intermediate node from the exit node.

3. The method of claim 1, wherein the forwarding comprises:
    forwarding an end-to-end signaling query message from the entry node to the exit node as the end-to-end signaling flow, wherein the end-to-end signaling query message is received from a sender; and
    forwarding an end-to-end signaling message from the exit node to the entry node as the end-to-end signaling flow; wherein the end-to-end signaling message is received from a receiver in response to the end-to-end signaling query message transmitted from the exit node.

4. The method of claim 1, wherein the tunnel signaling flow comprises at least one of a quality of service (QoS) signaling a network resource reservation signaling; and a network security signaling.

5. The method of claim 1, wherein the IP tunneling path comprises at least one of an Internet Protocol version 4 (IPv4) network and an Internet Protocol version 6 (IPv6) network.

6. The method of claim 1, wherein the sender is the MN, and the receiver is a corresponding node (ON).

7. The method of claim 1, wherein the searching for the CRN comprises configuring a discovery flag value for the end-to-end signaling flow when the CRN is discovered, and the searching for the CRN is completed when the discovery flag value is configured.

8. The method of claim 7, wherein the discovery flag is configured by the HA.

9. The method of claim 1, wherein the searching for the CRN comprises configuring a discovery flag value for the tunnel signaling flow when the CRN is discovered; and the searching for the CRN is completed when the discovery flag value is configured.

10. The method of claim 9, wherein the discovery flag is configured by the CRN.

11. The method of claim 1, wherein the releasing is performed by a node on the local tunneling path which has received the tunnel signaling message.

12. The method of claim 11, wherein the releasing is performed when a value of a tunnel flow identifier of the tunnel signaling flow associated with the tunnel signaling message is changed by the hand-off.

13. A non-transitory computer readable storage medium storing a program for implementing a method of processing a signaling flow of an Internet Protocol (IP) network that has an IP tunneling path connected to an end-to-end signaling flow, the method comprising:
    generating a tunnel signaling flow corresponding to the end-to-end signaling flow of an end-to-end path;
    transmitting the generated tunnel signaling flow to at least one node on the IP tunneling path; the at least one node on the IP tunneling path performing a tunnel signaling in response to receiving the tunnel signaling flow;
    forwarding the end-to-end signaling to an exit node of the IP tunneling path;
    receiving an end-to-end signaling response corresponding to the end-to-end signaling flow from the exit node, the end-to-end signaling response generated based on a completion of tunnel signaling;
    searching for a crossover node (CRN) generated by a hand-off of a mobile node (MN), by using a query message transmitted from the MN or a reserve message transmitted from the MN;
    transmitting a tunnel signaling message including a release flag to at least one node on a local tunneling path, of the IP tunneling path, connecting the MN with the CRN prior to the hand-off; and releasing at least one of an end-to-end signaling state and a tunnel signaling state of the CRN by referring to the release flag, wherein a correspondence relationship between the tunnel signaling flow and the end-to-end signaling flow is stored, wherein a timer of the at least one node on the local tunneling path is varied after the releasing.

14. A network apparatus performing tunnel signaling over an IP tunneling path, the network apparatus comprising:

an end-to-end interface configured to transmit and receive an end-to-end signaling flow processed by a node on the end-to-end path through an end-to-end path connected to the IP tunneling path;

a tunnel interface configured to transmit and receive a tunnel signaling flow through the IP tunneling path, the tunnel signaling flow corresponding to the end-to-end signaling flow of an end-to-end path; and a tunnel signaling control unit configured to generate the tunnel signaling flow corresponding to the end-to-end signaling flow, to control tunnel signaling over the IP tunneling path, to search for a crossover node (CRN) that is generated by a handoff of the MN, by using a query message transmitted from the MN or a reserve message transmitted from the MN, to transmit a tunnel signaling message including a release flag to at least one node on a local tunneling path, of the IP tunneling path, connecting the MN with the CRN prior to the hand-off, and to release at least one of an end-to-end signaling state and a tunnel signaling state of the CRN by referring to the release flag, wherein a correspondence relationship between the tunnel signaling flow and the end-to-end signaling flow is stored, wherein a timer of the at least one node on the local tunneling path is varied after the releasing, wherein the end-to-end interface receives an end-to-end signaling response corresponding to the end-to-end signaling flow from the exit node; the end-to-end signaling response generated based on a completion of tunnel signaling.

15. The apparatus of claim 14, further comprising:

a message generation unit configured to generate a tunnel signaling message of the tunnel signaling flow by referring to an end-to-end signaling message of the end-to-end signaling flow.

16. The apparatus of claim 14, further comprising:

an Internet Protocol (IP) packet extraction unit configured to extract an IP packet from at least one of the tunnel signaling flow and the end-to-end signaling flow;

a flag reading unit configured to read a flag value associated with the tunnel signaling flow from a data field of the IP packet;

a flag configuration unit configured to at least one of configure and modify the flag value stored in the data field of the IP packet; and a flag control unit configured to control at least one of transmitting and receiving of the tunnel signaling flow by referring to the read flag value, and to transmit a flag value, to be at least one of configured and modified, to the flag configuration unit.

* * * * *